United States Patent
Ejiri

(10) Patent No.: US 6,337,867 B1
(45) Date of Patent: Jan. 8, 2002

(54) MULTIPLEXOR

(75) Inventor: Satoru Ejiri, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/038,851

(22) Filed: Mar. 12, 1998

(30) Foreign Application Priority Data

Mar. 12, 1997 (JP) .............................. 9-056763

(51) Int. Cl.$^7$ .......................... H04J 3/02; H03K 17/00; H02H 3/05
(52) U.S. Cl. ..................... 370/537; 370/242; 714/25; 714/34
(58) Field of Search ................................. 370/216, 225, 370/226–228, 241, 242, 247–248, 251–252, 537, 538–540, 541; 714/1, 25, 30–31, 34

(56) References Cited

U.S. PATENT DOCUMENTS

| 4,805,165 A | | 2/1989 | Kawamura et al. ......... 370/535 |
| 5,123,015 A | * | 6/1992 | Brady, Jr. et al. ........... 370/539 |
| 5,196,933 A | | 3/1993 | Henot .................. 375/204.05 |
| 5,249,037 A | | 9/1993 | Sugiyama et al. .......... 348/452 |

FOREIGN PATENT DOCUMENTS

| JP | 59169277 | 9/1984 |
| JP | 1-160130 | 6/1989 |
| JP | 1-162437 | 6/1989 |
| JP | 2-76337 | 3/1990 |
| JP | 2-161841 | 6/1990 |
| JP | 3-158041 | 7/1991 |
| JP | 4-276930 | 10/1992 |
| JP | 4-337937 | 11/1992 |
| JP | 5-122222 | 5/1993 |
| JP | 6-69926 | 3/1994 |
| JP | 7-193813 | 7/1995 |
| JP | 7-321817 | 12/1995 |
| JP | 8-18562 | 1/1996 |

\* cited by examiner

Primary Examiner—Wellington Chin
Assistant Examiner—Maikhanh Tran
(74) Attorney, Agent, or Firm—Sughrue Mion, PLLC

(57) ABSTRACT

A multiplexor multiplexing an unlimited number of channels without the load on the multiplexor being increased. This multiplexor has a plurality of one channel encoders, for example four stages of encoders connected in series. When the first encoder is inputted with audio/video data of one channel, the data is inputted from the first encoder to the second encoder at the next stage, multiplexed by audio/video data of one channel inputted to the second encoder and then inputted to the third encoder at the next stage. By repeating this multiplexing, the number of multiplexed channels can be increased, and the load on the multiplexor is not increased because each encoder is inputted only with data for one channel. An abnormality detector is provided for each encoder to release an abnormal encoder from the multiplexor when the encoder's abnormality is detected.

10 Claims, 5 Drawing Sheets

MULTIPLEXOR

BACKGROUND OF THE INVENTION

1. Field of the Invention

The present invention relates generally to a multiplexor, particularly to a multiplexor for multiplexing fixed-length packets in digital broadcasting of video and audio.

2. Description of the Related Arts

FIG. 1 is a block diagram illustrating a prior art multiplexor of this type. This multiplexor shows a case where three channels of video and audio are multiplexed. A case of multiplexing a plurality of channels other than three channels is also described similarly.

For picture (hereinafter referred to as video) inputs, a video signal for a first channel (ch) is outputted through preprocessing unit 101 and video encoder 102 for encoding a video signal, a video signal for a second channel is outputted through preprocessing unit 103 and video encoder 104 for encoding a video signal, and a video signal for a third channel is outputted through preprocessing unit 105 and video encoder 106 for encoding a video signal.

Multiplexor 107 is inputted with video encoded data from video encoders 102, 104 and 106, with audio encoded data from the first to third channels and with synchronization information.

The video encoded data and audio encoded data of the three channels are multiplexed at multiplexor 107 and outputted to a transmission line.

In this way, when audio data and video data are multiplexed, full number of channels to be multiplexed are inputted in parallel into one multiplexor unit with channels each having components of one channel (digital video data and digital audio data) respectively, and generates a multiplexed transmitting signal including a plurality of channels.

The prior art multiplexor, however, has a drawback that the number of channels to be multiplexed is limited by the number of input ports since just one multiplexor is applied for the multiplexing.

In addition, the prior art multiplexor has a drawback that since multiplexed data for a plurality of channels are processed by one multiplexor, when high quality digital video data, which requires a high transmission rate, is multiplexed, the load on the multiplexor is considerably increased by every increase of the number of channels in later on.

Furthermore, since information used for synchronous processing of video and audio in digital broadcasting is required to be added to multiplexed data, multiplexing a lot of channels with one multiplexor is limited.

Japanese Patent Application Laid-Open No.276930/92 discloses a technique for eliminating the drawback of limiting the number of multiplexed channels by the number of input ports.

This technique discloses a constitution to connect a plurality of multiplexors in serial stages, and multiplexing a plurality of audio channels, each multiplexor multiplexes also a multiplexed output of multiplexer in the preceding stage to transmit to the multiplexor at the subsequent stage.

In this technique, however, each multiplexor is inputted a great many audio data of a plurality of channels, so that the drawback of increasing the load on multiplexors at the later stages due to an increase in the number of channels is not eliminated.

Additionally, in such a multiplexor with multistage connections, when a multiplexor in the connections is in an abnormal condition or power-off state, data for any channels is not outputted to a transmission line even though a multiplexor at the subsequent stage is in a normal condition or power-on state.

In other words, the technique has a drawback that when an abnormality occurs in any one of multiplexors, all of the multiplexors in the system falls into malfunction.

SUMMARY OF THE INVENTION

It is an object of the present invention to provide a multiplexor in which the number of channels to be multiplexed is not limited, the load on a multiplexor is not increased and is capable of outputting data of channels inputted from normal multiplexing means to a transmission line even though an abnormal condition occurs in any one of multiplexing means.

In order to achieve the object mentioned above, the present invention provides a multiplexor for multiplexing a plurality of data comprising a plurality of multiplexing means connected in series, said multiplexing means having a first input section for inputting data of one channel, a second input section for inputting data outputted from multiplexing means at the preceding stage, a multiplexing section for multiplexing data inputted from the first and second input sections and a control section for controlling the first and second input sections and the multiplexing section.

Also, the present invention includes a case that the data of one channel is a fixed-length packet.

In addition, it is also a preferred aspect of the present invention in which said control section comprises a clock input portion for being inputted a clock from multiplexing means at the subsequent stage, a clock separating portion for separating and sending the inputted clock for controlling said first and second input sections and a clock output portion for transmitting a clock for controlling the second input section to a control section of the multiplexing means at the preceding stage, and in which the each multiplexing means comprises an abnormality detecting section for detecting an abnormality within the host multiplexing means and a switching section for separating the host multiplexing means from the multiplexing means at the preceding and subsequent stages to connect them directly when an abnormality is detected by the abnormality detecting section, also in which a packet generating unit is included for generating a stuffing packet when the multiplexing means is separated from the multiplexing means at the preceding and subsequent stages for stuffing a time slot otherwise inputted in by the host multiplexing means.

DESCRIPTION OF THE PREFERRED EMBODIMENT

Figure 1:
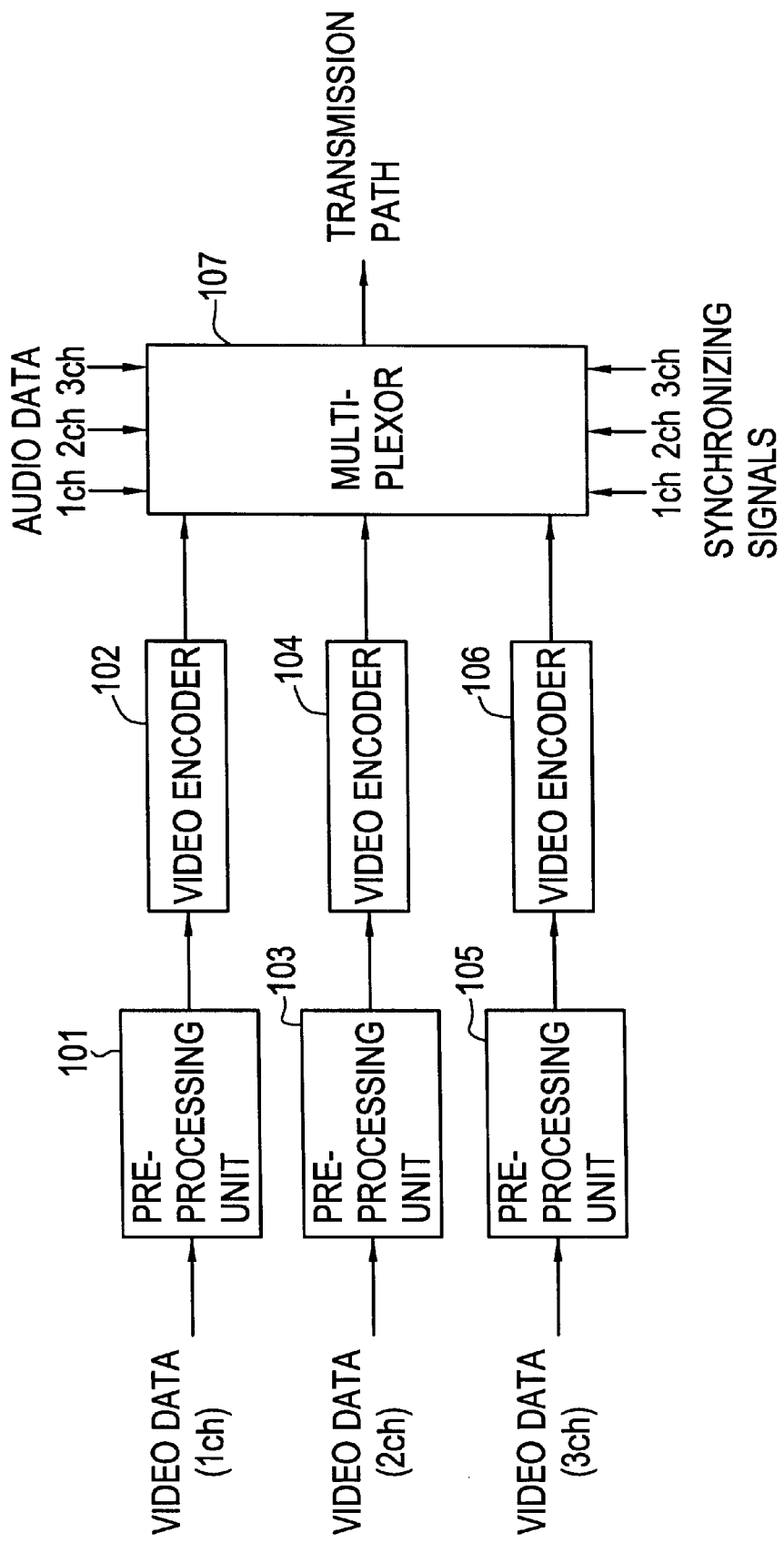
FIG. 1 is a block diagram illustrating an exemplary prior art multiplexor.

An embodiment in accordance with the present invention will hereinafter be described referring to the drawings. FIG.

2 is a block diagram illustrating an exemplary embodiment of a multiplexor in accordance with the present invention.

The multiplexor consists of a first through fourth one-channel encoders 4 through 7 and a null packet sending block 8.

The first through fourth one-channel encoders 4 through 7 have the same internal structure, so that the one-channel encoder 4 will hereinafter be described specifically. The one-channel encoder 4 consists of an audio encoder 1 for encoding audio data of one channel, a video encoder 2 for encoding video data of one channel and a multiplexor unit (MUX) 3 for time-division multiplexing digital audio data outputted from the audio encoder 1 and digital video data outputted from the video encoder 2 to multiplexed data outputted from the one-channel encoder at the preceding stage.

Also, audio data and video data inputted to encoders 1, 2 are formed in a fixed-length packet.

Null packet sending block 8 is provided for sending null information at a predetermined timing.

For these connections, a port output (port OUT) of null packet sending block 8 at the most preceding stage is connected to a port input (port IN) of first one-channel encoder 4, a port output of first one-channel encoder 4 is connected to a port input of second one-channel encoder 5, a port output of second one-channel encoder 5 is connected a port input of third one-channel encoder 6, a port output of third one-channel encoder 6 is connected to a port input of fourth one-channel encoder 7, a port output of fourth channel encoder 7 is connected to transmission path 9.

The operation of null packet sending block 8 will be described later. First, the operation of first one-channel encoder 4 through fourth one-channel encoder 7 is simply described.

Audio/video data of one channel inputted to first one-channel encoder 4 is outputted to multiplexor unit 13 of second one-channel encoder 5 through a multiplexor unit 3.

Audio/video data of one channel inputted to second one-channel encoder 5 is time-division multiplexed with the audio and video data inputted from first one-channel encoder 4 through multiplexor unit 13 to be outputted to third channel encoder 6.

Audio/video data of one channel inputted to third one-channel encoder 6 is time-division multiplexed with the audio and video data outputted from second one-channel encoder 5 through multiplexor unit 23 to be outputted to fourth one-channel encoder 7.

Audio/video data of one channel inputted to fourth one-channel encoder 7 is time-division multiplexed with the audio and video data outputted from the third one-channel encoder 6 through multiplexor unit 33 to be outputted to transmission line 9.

Clock C1 is inputted from external clock source to fourth one-channel encoder 7, clock C2 is inputted from fourth one-channel encoder 7 to third one-channel encoder 6, a clock C3 is inputted from third one-channel encoder 6 to second one-channel encoder 5, clock C4 is inputted from second one-channel encoder 5 to first one-channel encoder 4, and clock C5 is inputted from first one-channel encoder 4 to null packet sending block 8.

Figure 3:
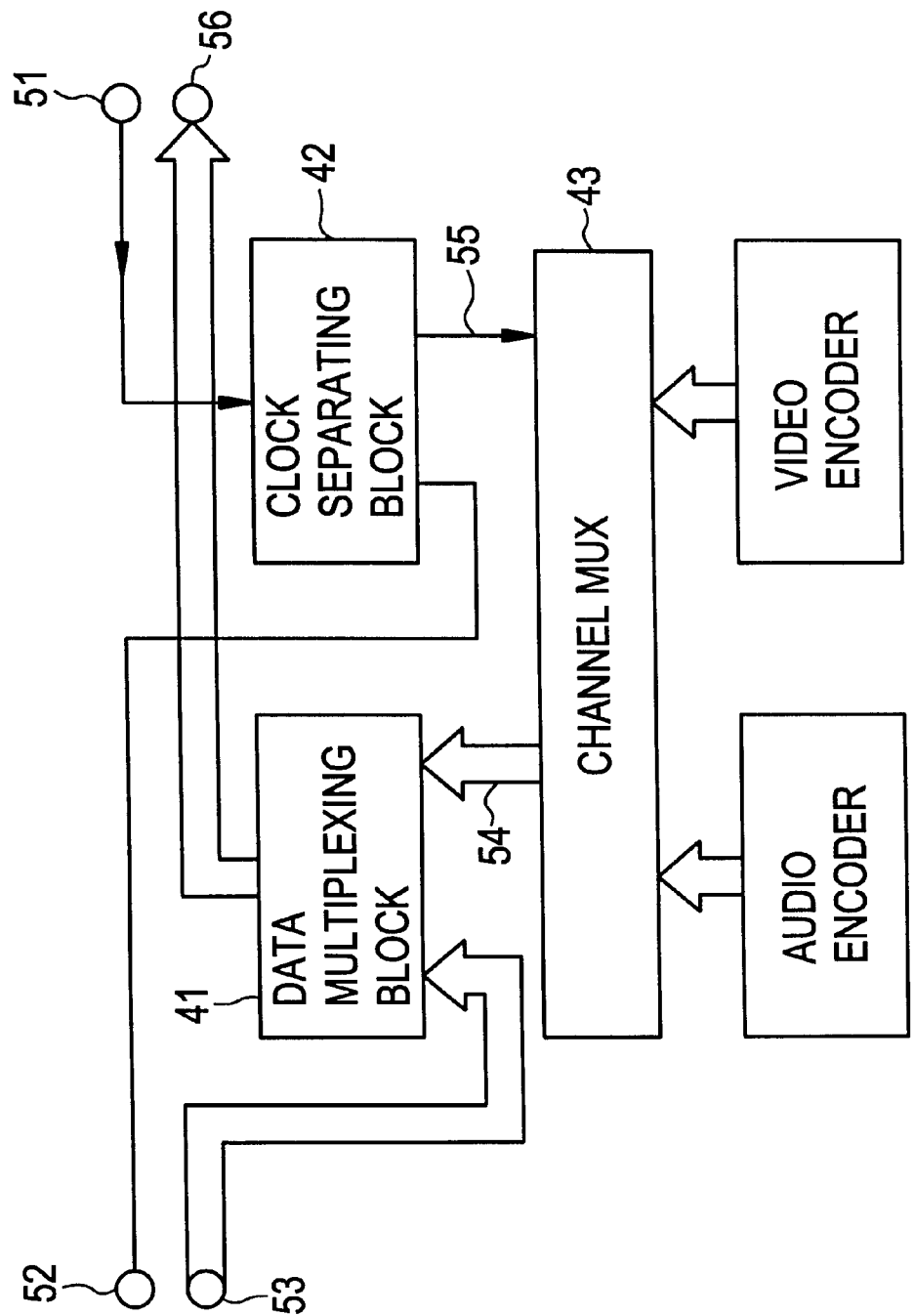
FIG. 3 is a block diagram illustrating a multiplexor unit shown in FIG. 2.

Next, the structure of multiplexor units 3, 13, 23 and 33 will be described. FIG. 3 is a block diagram illustrating the multiplexor unit.

Multiplexor units 3, 13, 23 and 33 have the same structure. Each multiplexor unit consists data multiplexing block 41 for multiplexing audio and video data 54 of one channel with multiplexed data 53 from a multiplexor unit at the preceding stage to output multiplexed data 56 for the instance multiplexor, separating block 42 for separating a clock 51 inputted from the subsequent stage into clock 55 for the instance multiplexor unit and clock 52 for the multiplexor unit at the preceding stage (the null packed sending block 8 in the case of multiplexor unit 3), and channel multiplexor 43 for multiplexing digital audio data and digital video data. FIG. 3 shows an audio encoder and a video encoder for convenience sake.

Figure 4:
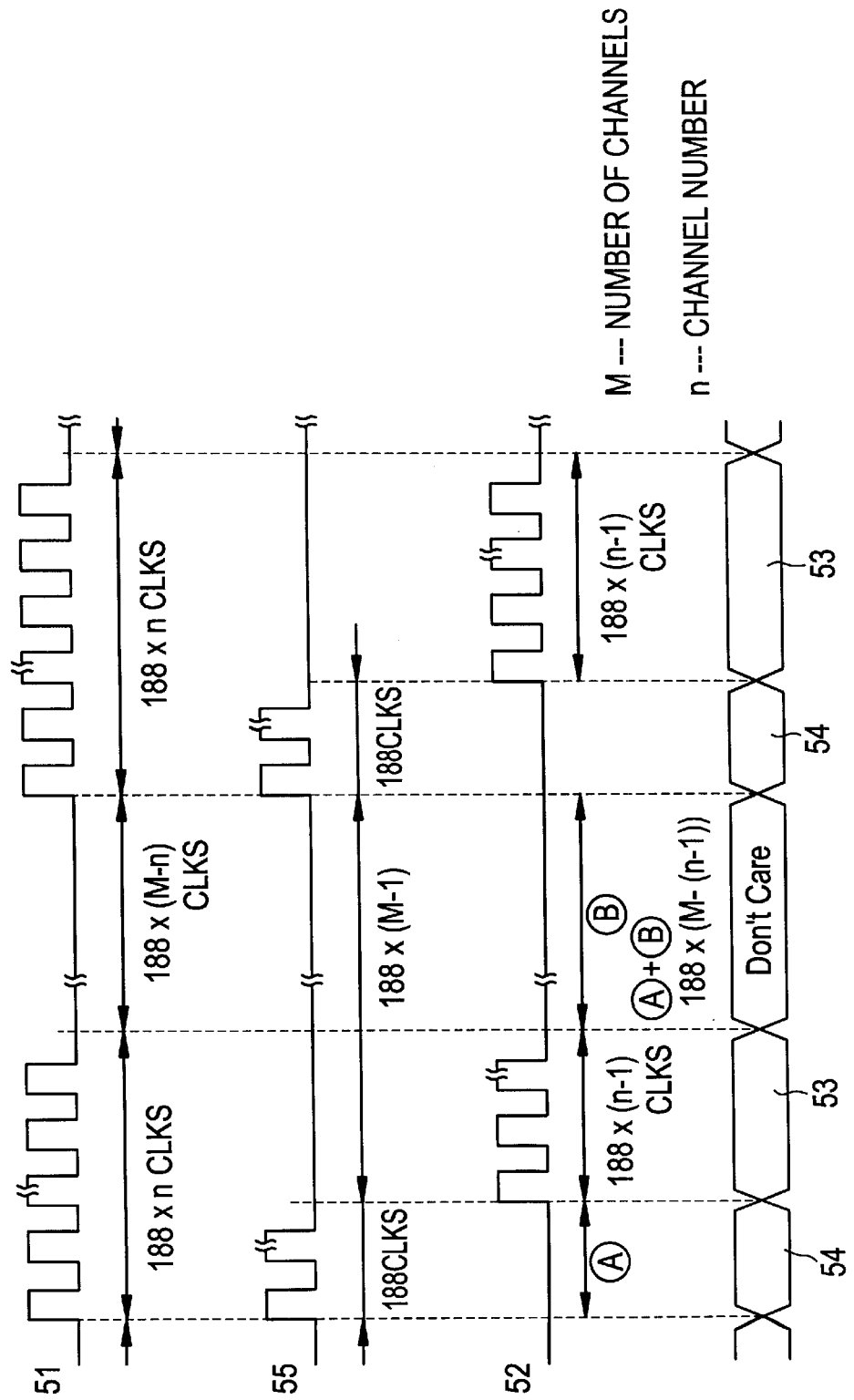
FIG. 4 is a timing chart illustrating the relationship between clocks and input data.

Next, the process of synthesizing data according to clocks will be described. FIG. 4 is a timing chart illustrating the relationship between the clocks and data.

The numbers shown at the left end in FIG. 4 correspond to those of clocks and data shown in FIG. 3.

The present invention gives an example of multiplexing a fixed-length packet of 188 bytes following the MPEG (Moving Picture Experts Group) -2 standard. The number of bytes, however, is not limited to 188 bytes and can be optionally set.

Clock 51 inputted from the subsequent stage has the same pulse width as the final transmission clock (clock C1 inputted to final stage 7) and is outputted in burst mode periodically at the ratio of 188×n:188×(M−n), where n represents a channel number (one-channel encoder number) and M represents the number of channels constituting the multiplexor (number of one-channel encoders).

In other words, clock 51 shows the waveform of a clock inputted to a multiplexor unit of n-th one-channel encoder.

Clock 55 is a clock used for an instance stage, and is 188 clocks. Digital audio and video data 54 for one channel inputted to the instance multiplexor unit is inputted to data multiplexing block 41 at this clock timing.

Clock 52 is a clock for outputting to the preceding stage, and is 188×(n−1) clocks which is the remaining clocks obtained by subtracting 188 clocks for the present stage from 188×n clocks. Multiplexed data 53 is inputted to data synthesizing block 41 at this clock timing.

Digital audio and video data 54 of one channel inputted to the instance multiplexor unit and multiplexed data 53 from the preceding stage are multiplexed and outputted from data multiplexing block 41 as multiplexed data 56.

In particular, digital audio and video data 54 and multiplexed data 53 from the preceding stage are inputted to data multiplexing block 41 in synchronized with clocks 55 and 52 respectively, and are multiplexed to be outputted as data 56 in burst regions (the region of 188×n CLKS in 51 in FIG. 4) where clock 51 exists.

The above-mentioned operation is executed in each multiplexor unit, so that data outputted from the final stage multiplexor unit 33 is data for the total number of channels n obtained by multiplexing data for 1 through n channels.

Next, the abnormality monitoring unit will be described. This is a unit provided in each of one-channel encoders 4 through 7 for preventing the operation of encoders other than the instance encoder from stopping even though an abnormality or power-off occurs in one channel encoder.

Figure 5:
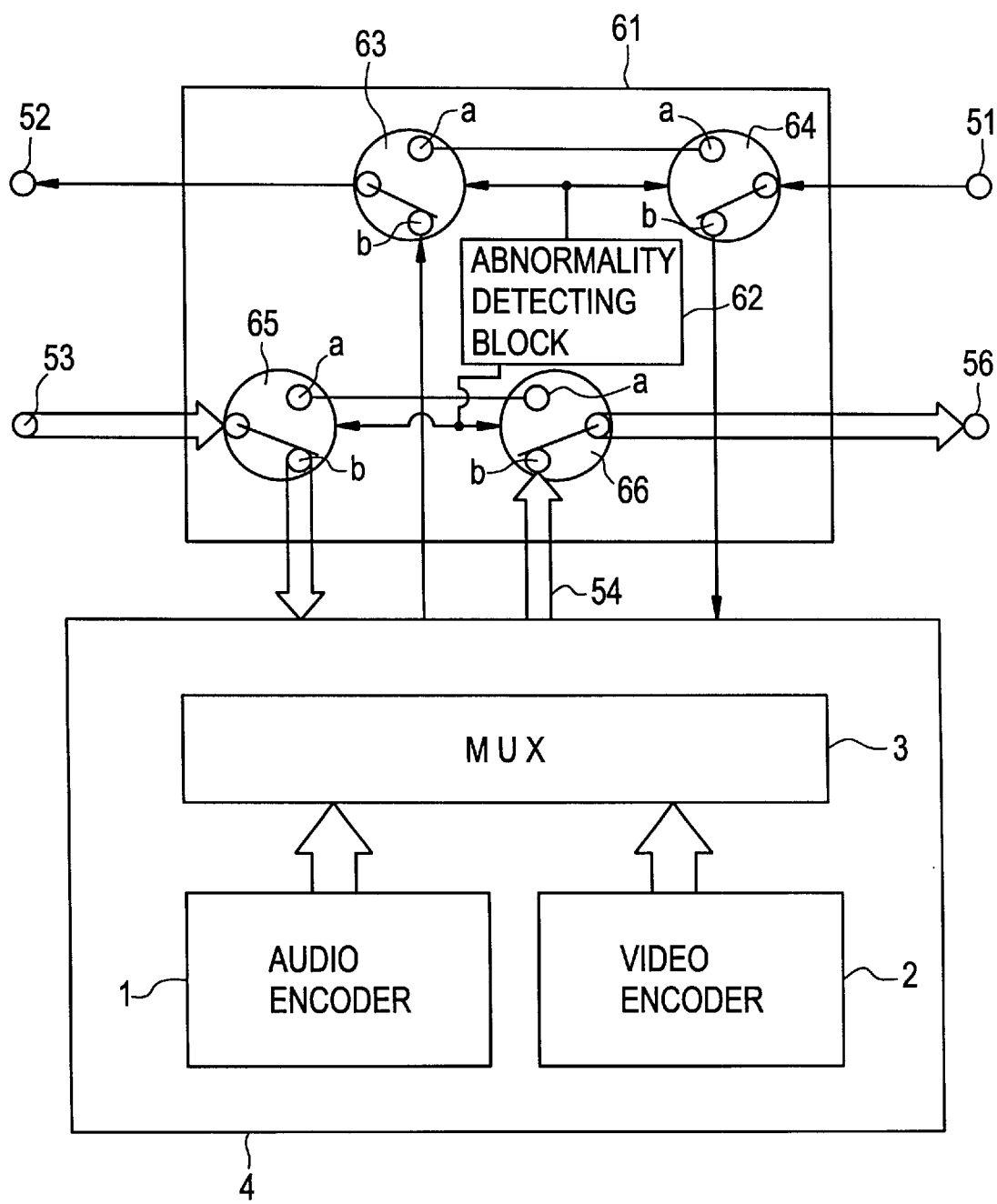
FIG. 5 is a block diagram illustrating an exemplary abnormality monitoring unit.

FIG. 5 is a circuit diagram illustrating an exemplary abnormality monitoring unit. The abnormality monitoring unit 61 is provided for switching data lines and clock providing lines which are inputted and outputting from the one-channel encoder, and is connected to the port input and the port output for each one-channel encoder. FIG. 5 shows the abnormality monitoring unit 61 connected to one-channel encoder 4 by way of example. In FIG. 5, clocks 51, 52 and data 53, 54 and 56 correspond to those designated the same numbers in FIG. 3.

The abnormality monitoring unit 61 consists of abnormality detecting block 62, clock switching relays 63, 64 and data switching relays 65, 66.

When an abnormality or power-off is not detected in abnormality detecting block 62, all relays 63 to 66 are switched to b sides. This is a normal connection and both the clocks and data are inputted and outputted through the path mentioned above.

On the other hand, when an abnormality or power-off is detected in abnormality detecting block 62, all relays 63 to 66 are switched to a sides. Thus, data output 54 of one-channel encoder 4 is disconnected at relay 66, multiplexed data 53 from the preceding stage is outputted directly to the one-channel encoder 5 at the subsequent stage through relay 65. Clock 51 inputted from the subsequent stage is outputted directly to the one-channel encoder at the preceding stage (null packet sending block 8 in the case of one-channel encoder 4) through relays 64, 63.

Therefore, one-channel encoder 4 in which an abnormality or power-off occurs is separated from the channel encoder system and the one-channel encoders at the preceding and subsequent stages are directly connected, so that the data multiplexing is not discontinued.

Figure 2:
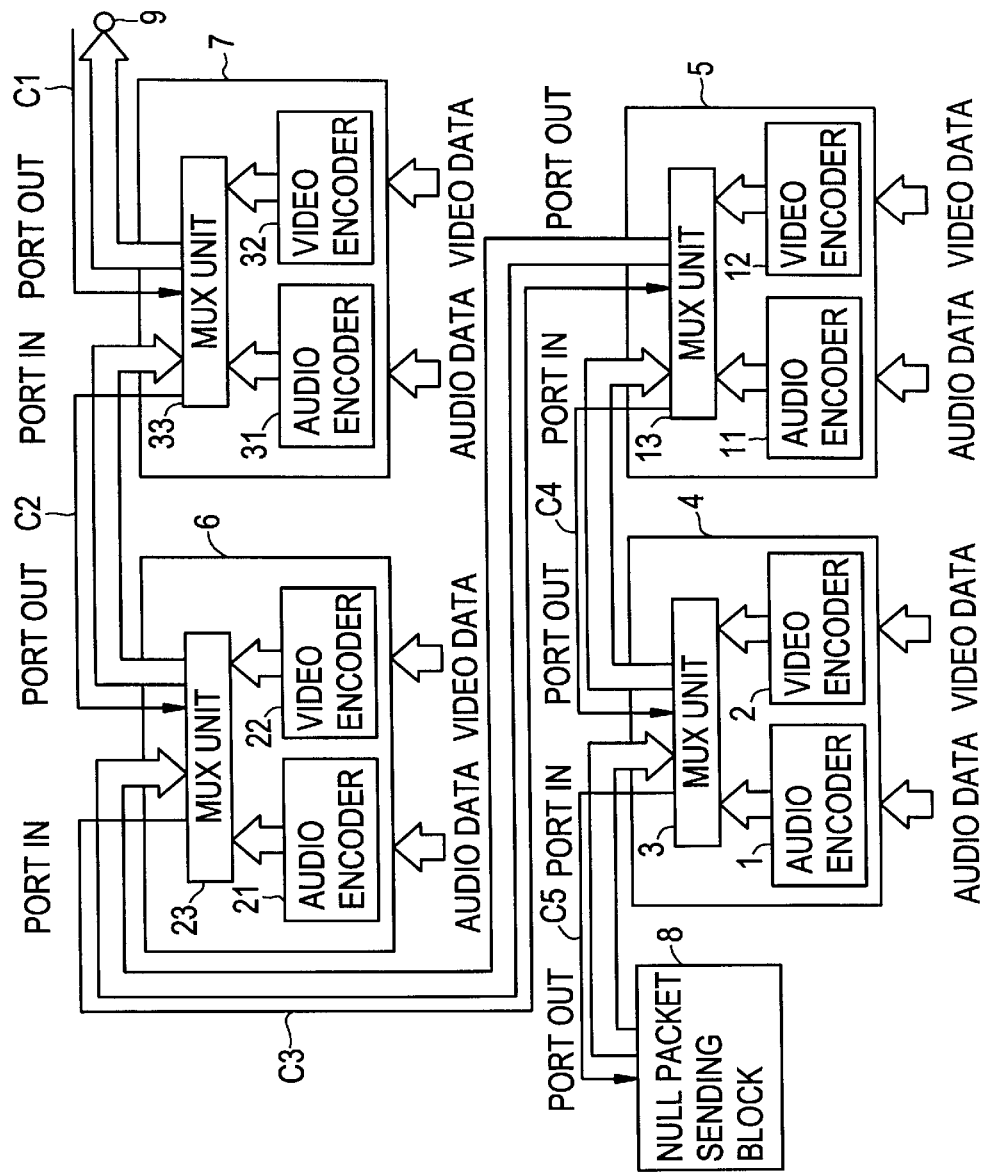
FIG. 2 is a block diagram illustrating an embodiment of a multiplexor in accordance with the present invention.

Finally, null packet sending block 8 will be described. Null packet sending block 8 is connected at the preceding stage of one-channel encoder 4 shown in FIG. 2. Thus, when an abnormality or power-off does not occur in any one of one-channel encoders 4 through 7, a burst clock is not inputted.

That is, it is because 188×(n−1) in the wave form of clock 52 in FIG. 4 corresponds to the burst clock, and substituting 1 for n in the formula makes the formula to 0.

On the other hand, assuming that an abnormality or power-off occurs in one-channel encoder 4, 2 is entered for n in formula 188×(n−1). The 188 burst clocks then occur. In other words, the 188 burst clocks are inputted to null packet sending block 8.

When the 188 burst clocks are inputted, null packet sending block 8 sends a fixed-length stuffing packet (i.e. null packet) for stuffing the transmission path in synchronized with the 188 clocks. Thus, a time slot otherwise inputted in the one-channel encoder 4 can be stuffed with the stuffing packet.

In accordance with the present invention, a multiplexor is provided for multiplexing data comprising a plurality of multiplexing means connected in series, each of said multiplexing means including a first input section for inputting data of one channel, a second input section for inputting data outputted from multiplexing means at the preceding stage, a multiplexing section for multiplexing data inputted from the first and second input sections, and a control section for controlling the first and second input sections and the multiplexing section, so that the number of channels to be multiplexed can be increased only by adding the one-channel encoder. Thus, the number of channels. to be multiplexed is not limited. In addition, each one-channel encoder is inputted only with data of one channel, so that the load on each multiplexor is not increased.

In accordance with another phase of the present invention, each of said one-channel encoder further comprises an abnormality detecting section for detecting an abnormality in the host one-channel encoder, a switching section for separating the troubled one-channel encoder from multiplexors at the preceding and subsequent stages when an abnormality is detected by the abnormality detecting section to connect directly the one-channel encoders at the preceding and subsequent stages, so that data for channels outputted from normal one-channel encoders can be outputted to a transmission line even though an abnormality occurs in any one of one-channel encoders.

What is claimed is:

1. A multiplexor having a plurality of multiplexing means connected in series for multiplexing a plurality of data channels, each of said multiplexing means comprising:
   a first input section for inputting data of one channel;
   a second input section for inputting data outputted from multiplexing means at the preceding stage;
   a multiplexing section for multiplexing data inputted from said first and second input sections;
   a control section for controlling said first and second input sections and said multiplexing section,
   wherein said control section includes
      a clock input portion for being inputted a clock from multiplexing means at the subsequent stage;
      a clock separating portion for separating and sending the inputted clock for controlling said first and second input section; and
      a clock output portion for transmitting the clock for controlling the second input section to the control section of the multiplexing means at the preceding stage.

2. A multiplexor having a plurality of multiplexing means connected in series for multiplexing a plurality of data channels, each of said multiplexing means comprising:
   a first input section for inputting data of one channel;
   a second input section for inputting data outputted from multiplexing means at the preceding stage;
   a multiplexing section for multiplexing data inputted from said first and second input sections;
   a control section for controlling said first and second input sections and said multiplexing section,
   wherein said data of one channel is a fixed-length packet,
   wherein said control section includes
      a clock input portion for being inputted a clock from multiplexing means at the subsequent stage;
      a clock separating portion for separating and sending the inputted clock for controlling said first and second input section; and
      a clock output portion for transmitting the clock for controlling the second input section to the control section of the multiplexing means at the preceding stage.

3. A multiplexor having a plurality of multiplexing means connected in series for multiplexing a plurality of data channels, each of said multiplexing means comprising:
   a first input section for inputting data of one channel;
   a second input section for inputting data outputted from multiplexing means at the preceding stage;
   a multiplexing section for multiplexing data inputted from said first and second input sections;
   a control section for controlling said first and second input sections and said multiplexing section;
   an abnormality detecting section for detecting an abnormality within host multiplexing means in which the abnormality detecting section is provided;
   a switching section for separating said host multiplexing means from multiplexing means at the preceding and subsequent stages in order to connect the preceding and subsequent stages directly when said abnormality detecting portion detects said abnormality.

4. A multiplexor having a plurality of multiplexing means connected in series for multiplexing a plurality of data channels, each of said multiplexing means comprising:

a first input section for inputting data of one channel;

a second input section for inputting data outputted from multiplexing means at the preceding stage;

a multiplexing section for multiplexing data inputted from said first and second input sections;

a control section for controlling said first and second input sections and said multiplexing section, wherein said data of one channel is a fixed-length packet;

an abnormality detecting section for detecting an abnormality within host multiplexing means in which the abnormality detecting section is provided; a switching section for separating said host multiplexing means from multiplexing means at the preceding and subsequent stages in order to connect the preceding and subsequent stages directly when said abnormality detecting portion detects said abnormality.

5. A multiplexor according to claim 1, wherein each of said multiplexing means further includes:

an abnormality detecting section for detecting an abnormality within host multiplexing means in which the abnormality detecting section is provided;

a switching section for separating said host multiplexing means from multiplexing means at the preceding and subsequent stages to connect them directly when said abnormality detecting portion detects an abnormality.

6. A multiplexor according to claim 2, wherein each of said multiplexing means further includes:

an abnormality detecting section for detecting an abnormality within host multiplexing means in which the abnormality detecting section is provided;

a switching section for separating said host multiplexing means from multiplexing means at the preceding and subsequent stages to connect them directly when said abnormality detecting portion detects an abnormality.

7. A multiplexor according to claim 3, wherein each of said multiplexing means further includes a packet generating unit for generating a stuffing packet when said host multiplexing means is separated from the multiplexing means at the preceding and subsequent stages for stuffing a time slot otherwise inputted in by said host multiplexing means.

8. A multiplexor according to claim 4 wherein each of said multiplexing means further includes a packet generating unit for generating a stuffing packet when said host multiplexing means is separated from the multiplexing means at the preceding and subsequent stages for stuffing a time slot otherwise inputted in by said host mutiplexing means.

9. A multiplexor according to claim 5, wherein each of said multiplexing means further includes a packet generating unit for generating a stuffing packet when said host multiplexing means is separated from the mutiplexing means at the preceding and subsequent stages for stuffing a time slot otherwise inputted in by said host multiplexing means.

10. A multiplexor according to claim 6, wherein each of said multiplexing means further includes a packet generating unit for generating a stuffing packet when said host multiplexing means is separated from the multiplexing means at the preceding and subsequent stages for stuffing a time slot otherwise inputted in by said host multiplexing means.

* * * * *